Nov. 18, 1947. R. W. WILSON Re. 22,936

DISHWASHING MACHINE

Original Filed May 31, 1940 2 Sheets-Sheet 1

RAYMOND W. WILSON,
INVENTOR.

BY R. B. Barlow.
ATTORNEY.

Nov. 18, 1947. R. W. WILSON Re. 22,936

DISHWASHING MACHINE

Original Filed May 31, 1940 2 Sheets-Sheet 2

RAYMOND W. WILSON,
INVENTOR.

BY R. W. Barton
ATTORNEY.

Reissued Nov. 18, 1947

Re. 22,936

UNITED STATES PATENT OFFICE 22,936

DISHWASHING MACHINE

Raymond W. Wilson, Glendale, Calif.; William J. Schworer administrator of said Raymond W. Wilson, deceased Original No. 2,315,572, dated April 6, 1943, Serial No. 338,136, May 31, 1940. Application for reissue December 9, 1944, Serial No. 567,346

21 Claims. (Cl. 134—138)

This invention relates to improvements in dishwashing machines.

It is among some of the more important objects of the invention to provide a dishwashing machine wherein the means for discharging the fluid that washes the dishes is directed against them in such a manner as simultaneously to wash them and to rotate the basket in which the dishes are contained, regulative means being provided whereby a uniform rotation of the basket is assured regardless of the fluctuation in water pressure which exists in different localities.

Another object of the invention is to provide an improved conservation of space arrangement of superior self-priming power jets in the floor of a shallow tub, discharging upwardly in the tub and having a common manifold outside of the tub connected to an exterior source of supply.

Another object of the invention is to provide an improved combination hydraulic and mechanical lift for vertically reciprocating the dish-containing basket during its rotation in a horizontal plane and to, at the completion of the washing operation, elevate the basket to a convenient point of accessibility for emptying and replenishing.

Another object of the invention is to provide an improved fluid valve controlled hydraulic mechanism in combination with spring opposed mechanism wherein a clean fluid is injected into both ends of the hydraulic cylinder.

Another object of the invention is to provide an improved combination of simply constructed parts peculiarly arranged and cooperating in such a manner to make less expensive, contribute to higher efficiency, and insure greater sanitation in devices to which this invention appertains.

One important object of the invention is to provide for maintaining a more sanitary condition of a hydraulically operated plunger by using a portion of the operating fluid to scavenge one of the hydraulic chambers in case of the entrance of any foreign mater into such chamber.

A still further object is to provide an improved combination of hydraulic and resilient operating means for moving the dish containing receptacle whereby properly timed, relatively slow movements of the receptacle in one direction are alternated with the desired quick return movements of said receptacle.

With the foregoing and other objects in view, the invention resides in the novel arrangement and combination of parts and in the details of construction hereinafter described and claimed, it being understood that changes in the precise embodiment of the invention herein disclosed may be made within the scope of that which is claimed without departing from the spirit of the invention.

Referring to the drawings, wherein is shown a preferred embodiment of the invention as now reduced to practice, approved and being sold to the trade, Fig. 1 is a plan view of the device installed within a tub adjacent to a sink, said device being shown applied to a drain board portion together with the usual plumbing fixtures. In this view the dish containing basket is eliminated to disclose more clearly the peculiar arrangement of jet pumps in the floor portion of the tub;

Figure 1:
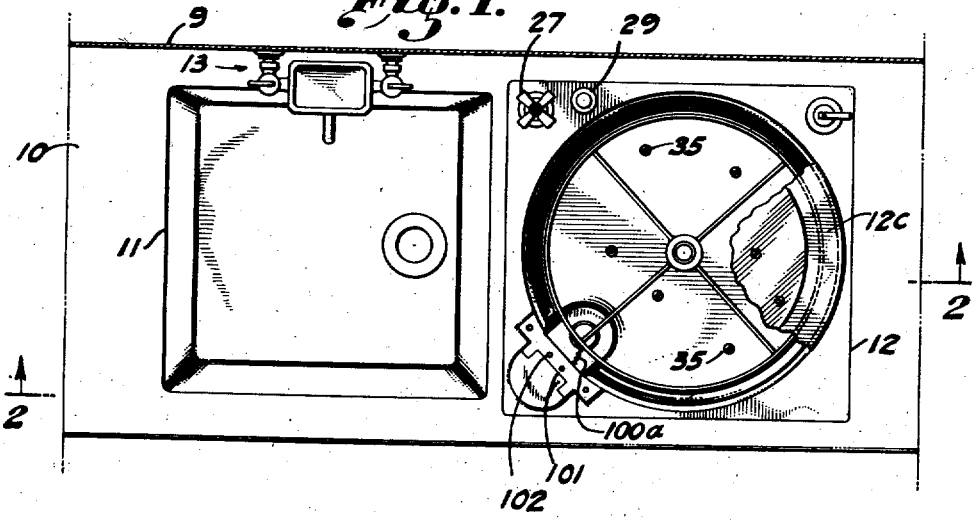

Speaking first of generalities relating to the invention, the numerals 9 and 10 indicate respectively the splash wall and drainboard, to which drain board is attached the sink 11 and juxtaposed wash tub 12. Said tub in Fig. 1 is shown provided with a fragment of a chrome and glass lid 12c. 13 is the combination hot and cold water spigot fixture connected by pipes 14 and 15 to hot and cold water supply sources respectively through the medium of the shut off valves 16 and 17.

A drain pipe 18 is shown connected to the sink 11 to which is screwed a T 19. Pipe 20 connects said T to a trap 21; and pipe 22, L 23 and pipe 24 connect the T with the sump portion of the tub 12. It will thus be seen that the T 19 provides a common outlet to the trap for both the sink and tub.

The invention now will be specifically set forth.

Pipe 25 is connected at one end to the hot water line 14 between the valve 16 and spigot 13. The other end of said pipe is connected to a globe valve 26 operable by means of the valve control 27 located on the top of the tub.

Pipe 28 in turn connects the globe valve 26 to the vacuum breaker or anti-splash, anti-syphon valve 29 which is also located in close proximity to the valve control 27 on the top of the tub.

Figures 3, 4, 5, 6, 7, 8, 9:
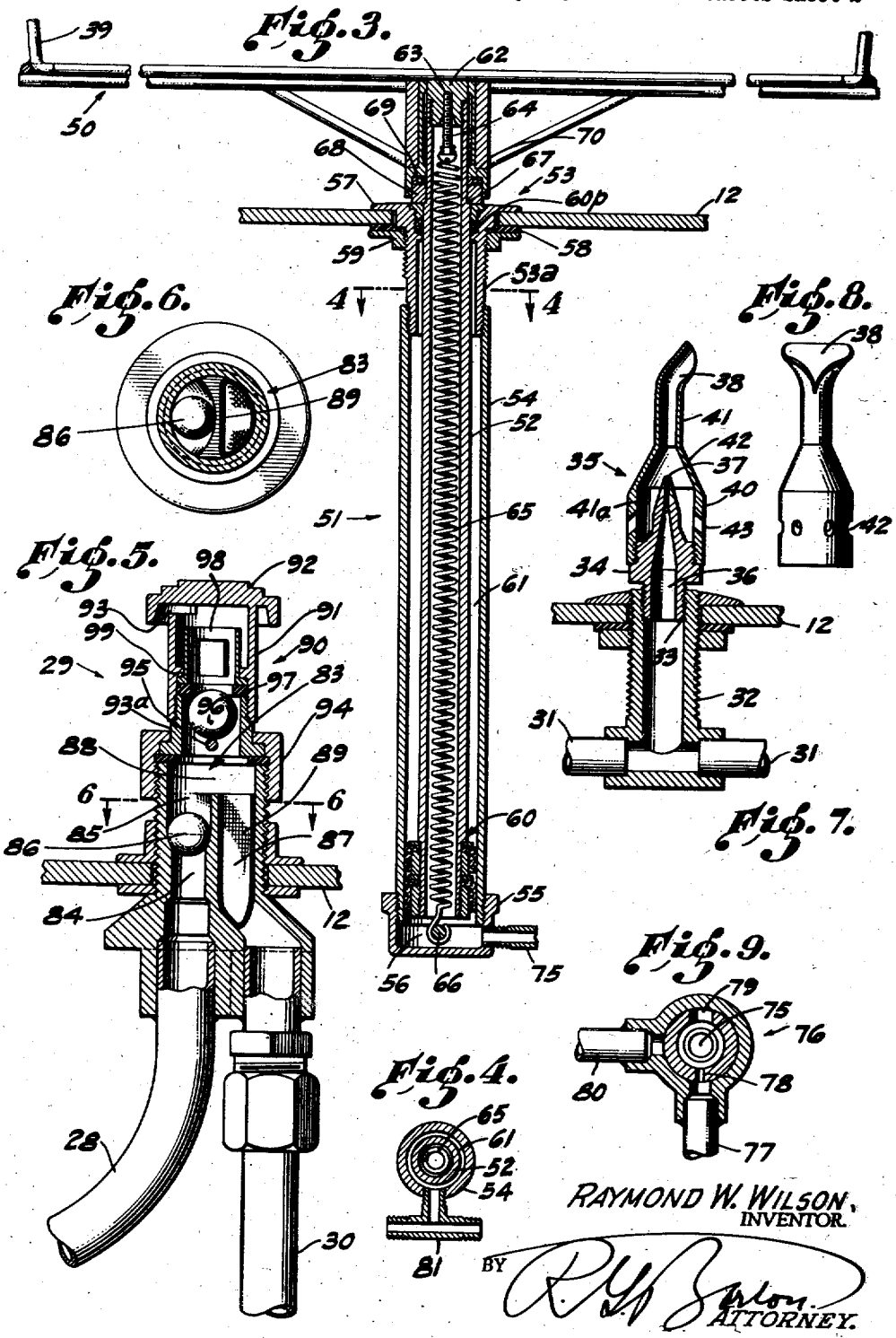
Fig. 3 is a vertical mid-section of the hydraulic lift broken away from the adjoining structure.
Fig. 4 is a horizontal section taken on line 4—4 of Fig. 3.
Fig. 5 is a vertical mid-section of the vacuum breaker including fragments of adjoining structures.
Fig. 6 is a horizontal section taken on line 6—6 of Fig. 5.
Fig. 7 is a vertical mid-section of one of the jet pumps including fragments of adjoining structures.
Fig. 8 is a perspective view of one of the jet nozzles.
Fig. 9 is a transverse section taken through the three way valve shown in Figs. 1 and 2.

Pipe 30 in turn connects the vacuum breaker to a manifold pipe 31 located just beneath the tub 12, and to this manifold pipe are fastened a plurality of unions 32, said unions being in turn connected in a leak proof manner to the bottom of the tub as shown in Fig. 7. Each of said unions has a threaded opening 33 into which is screwed a jet 34. Onto each said jet is screwed a nozzle 35 of the character shown in Figs. 7 and 8.

In Fig. 1 it will be noted the several nozzles 35 are circumferentially spaced throughout the bottom of the tub at different radial distances from the center thereof, and the manifold pipe 31 provides for this irregular spacing. The object of this peculiar spacing is to provide adequate means for automatically rotating the dish containing receptacle and for directing the streams of water at different angles to thoroughly cleanse the dishes. The particular directions of the issuing streams may also be varied to obtain a uniform rotation in localities where water pressures vary.

Each power jet is shown provided with an axially disposed duct 36, a portion of which is tapered and terminates in a restricted opening 37 in its tapered end. The threaded portion of the jet, which mates with the threads 33, provides for an angular adjustment whereby the heart shaped orifices 38 of the nozzles may be positioned in different planes to direct the spray of water issuing from them to not only rotate the basket 39 and cleanse the dishes, but also to direct a spray in a direction to retard the speed of rotation when this is deemed necessary in order to obtain the proper efficiency.

Each nozzle structure 35 comprises two tubular members 40 and 41 joined by a flaring wall 42. Tubular member 40 has a chamber 41*a* surrounding the tapered nozzle portion of the jet, said member 40 having the lower portion of its chamber threaded and screwed onto said jet. In said lower portion is formed a plurality of tapered holes 43 that extend upwardly and inwardly from the outer face of said member 40 into the lower portion of said chamber 41*a*.

The tubular member 41 has its axis coinciding with that of the axis of said restricted opening and a portion of its wall adjacent to its open end is slit, said wall portion being deflected toward the slit and expanded at each side thereof to form the heart shaped opening 38 at one side of the member through which the spray from the jet egresses. By this means said opening is sufficiently restricted to make the pumping power of the jet self-priming.

A description will now be given of the hydraulically elevatable and mechanically retractable apparatus for supporting the dishes whereby they are rotated and washed by the cycle of mechanism just described and in addition to these operations vertically reciprocated during the cleansing thereof and finally elevated to a point wherefrom they can be conveniently removed.

Figure 2:
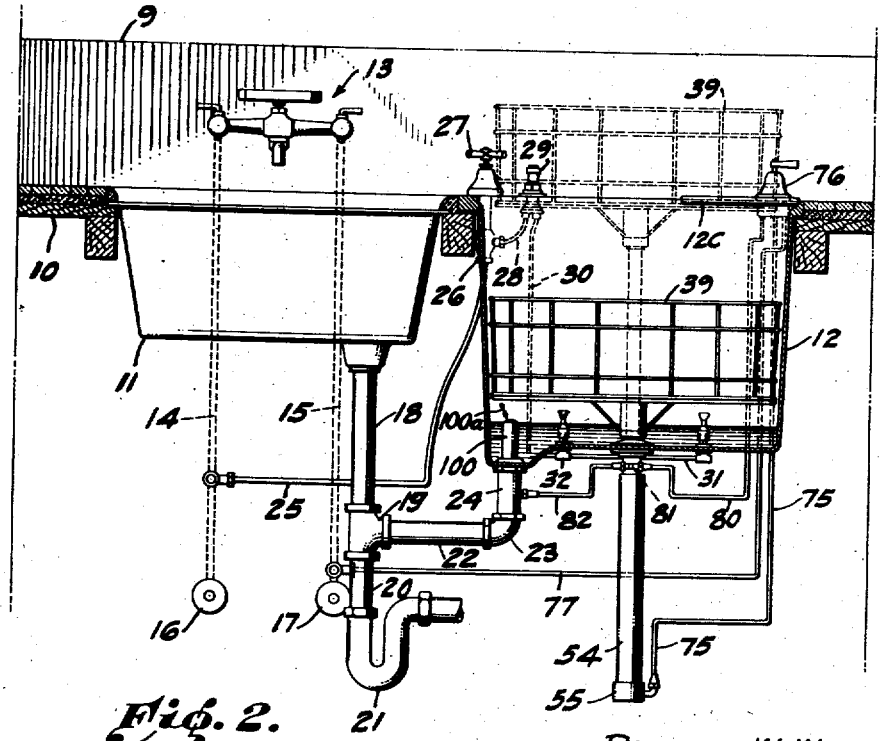
Fig. 2 is a section taken on line 2—2 of Fig. 1 with this difference, however, the dish basket has been added, the latter being shown in full lines in its depressed position, and in dotted lines in its elevated position in readiness for filling or emptying.

Turn-table 50 supports the wire basket 39 in which the dishes are placed. Said table is rotatably mounted on the upper portion of the hydraulic lift 51 which extends through the tub 12 in such a manner that all the framework of the table clears the nozzles 35 as shown in Fig. 2.

Referring now to Fig. 3, it will be seen that the lift 51 is supported principally by the tub 12 through the medium of the tubular connection 53. Said lift comprises a tubular cylinder 54, the upper end of which is screwed onto the lower portion of the connection 53 which extends through and well below the bottom surface of the tub. The lower end of the cylinder is closed by means of a cap 55, there being a space 56 provided between the closed end of said cap and the end of the cylinder.

The connection 53 is provided with an annular flange 57 which overlies the adjacent surrounding portion of the tub 12, said flange assuming practically all the weight of the lift together with that of the turn-table and the dishes supported thereby.

In order to make a leak proof joint between the flange 57 and floor portion of the tub, I provide a gasket 58 which is securely held in place by the annularly flanged lock nut 59.

Concentrically mounted within the cylinder 54 is a second tubular cylinder comprising the plunger 52. On the lower end of the plunger 52 is fastened a dual packing gland 60 whereby the annular space 61 between the cylinders 52 and 54 at that point is closed.

At the upper end of the plunger, subjacent its protruding portion, I provide a second packing gland 60*p*. This gland is formed in the connection 53 and provides a seal for preventing the water in the tub from entering the space 61.

Into the upper end of the plunger is screwed a plug 62, said plug being provided with a hole 63 axially tapped into its lower end and having the mouth of the hole conically tapered. Into the hole 63 is screwed a screw 64 having fastened to its head one end of a spirally coiled spring 65. The other end of the spring is fastened to an anchor pin 66 which underlies the lower end of the cylinder 54.

The part of the plunger which extends above the connection 53 has its exterior diameter slightly reduced to form a ledge 67 on which rests a thrust collar 68. A ball race 69 is in turn mounted upon the thrust collar, said race rotatably supporting the thimble 70 which encloses the upper end of the plunger, to which thimble is fastened the turn-table frame-work 50.

As a means for hydraulically actuating the plunger 52, I provide a pipe 75 which I screw into the cap 55 so as to discharge in the space 56. This pipe 75 I connect to a three-way valve 76 mounted at the drain board level in one corner of the tub portion as shown in Figs. 1 and 2. Leading from the valve 76 to the main cold water supply line 15 is a pipe 77. When the three-way valve is manually operated so as to place the restricted port 78 of the valve in communication with the pipe 77 as shown in Fig. 9, water in the pipe 77 flows through the valve 76, and in turn through pipe 75, exerting a pressure against the plunger 52 thereby elevating it against the opposition of the spring 65. The upward movement of the plunger is desirably made very slow in order that the spray directed against the dishes from the spray discharge openings 38 may, while entering between them at different angles as the basket is rotated as a result of the spray impinging against the dishes, have time to efficiently wash and cleanse the dishes and free them of garbage adhering to them. The restricted character of the port 78 contributes toward this slow movement, together with the opposition of spring 65 and of the fluid which occupies the annular space 61.

This upward movement is permitted during the washing operation until the dishes approach the glass cover 12c, or to unloading position when the dishes are washed, whereupon the valve 76 is manually operated to bring the unrestricted port 79 into registry with the port opening into the pipe 80, whereupon the water in the hydraulic lift is forced through the pipe 75 and the valve 76 into pipe 80, thence through T 81 and pipe 82, and in turn through pipe 24, L 23, pipe 22, T 19, pipe 20, trap 21 into the sewer.

Pipe 80, as stated, is connected to the T 81. T 81 in turn is screwed into the annular unthreaded surface 53a of the connection 53, see Fig. 4. This is done for the reason that if any foul water should ever seep past the gland 60p into the space 61, such water would be eventually discharged through the T into the pipe 82 as a result of the flow of the fresh water through pipe 80 on the down stroke of the plunger.

It will be obvious, however, that after the first operation of the plunger, the water forced out of the hydraulic lift, as a result of the energy stored up in the spring, will pass into pipe 75, through valve 76 and pipe 80 and will flow partly into the space 61 and partly into the pipe 82 because of the T connection 81.

However, each time the plunger is elevated, any water in the space 61 will be forced therefrom through the T 81 and into pipe 82 on account of the packing gland 60. This constant repurging of the space 61 by the clean water will always keep the interior of the lift sanitary and free from any foul odor.

Since at each downward movement of the plunger a portion of the water passes through the T 81 into the space 61, the water which flows into such space, is forced out through the T into pipe 82 on the upstroke of the plunger. The water occupying said space also acts as a retardant also, as has already been mentioned, to slow the upward movement of the plunger in addition to the opposition afforded by the spring 65.

The three retarding means, comprising the restricted opening 78, the spring 65 and the fluid occupying the space 61, produce a much slower upward movement of the plunger when compared with the downward movement wherein there is no spring opposition, or restricted outlet through which the water by-passes. It will therefore be noted that the slow upward movement and quick return movement coupled with simultaneous rotative movement of the dish supporting frame while operating in its working ranges provide new and useful means for more effectively washing dishes.

The vacuum breaker 29 prevents the water or sewage backed up into the tub from being entrained into the supply line 14 and thereby contaminating the water. This valve is shown on an increased scale in Figs. 5 and 6.

Describing next the anti-syphon and anti-splash valve and conduit structure shown in Fig. 5, which is supported by the tub shelf 12, a fragment of which is shown in this view, the hot water supply pipe 28 communicates with the lower section 83 of the anti-syphon valve assembly 29 by means of the supply passage 84. Said passage 84 has a diametrically enlarged upper portion 85, thereby affording at their juncture an upwardly directed annular valve seat for the ball check valve 86. Said passage 84 leads into one side portion of said section, there being parallel to it at the opposite side of the section a hot water delivery passage 87 into the lower end portion of which leads the pipe 38 that conducts the hot water to the jet pumps.

The passages 84 and 87 underlie a chamber 88 which affords communication between them. The upper portion of the passage 87 is shown furnished with a filter screen 89 to prevent particles of garbage from the dish water from being entrained and interfering with the action of valve 86. It also screens the water so that no foreign particles can enter and clog the wall openings in the jets.

The upper and anti-splash section 90 of the assembly 29 comprises a thimble like member 91, the crown portion 92 of which has a segmental air opening 93. Into the lower end of said member 91 screws a tubular connection 93a, the annularly flanged lower end of which is secured to the lower section 83 of the valve assembly by means of a coupler 94 which screws on to said lower section, as shown in Fig. 5.

Diametrically through the tubular connection 93a extends a pin 95 which supports the ball valve 96, a rubber or rubber-like annular valve seat member 97 being provided superjacent to said ball valve 96. Said member 97 rests upon the upper end of the tubular connection 93a and is kept in place thereon by means of an upper sleeve 98 having a peripherally flanged lower end which, when the thimble like member 91 is screwed on is kept in place by its internal lugs 99.

The plug 100 is shown seated in the sump portion of the tub 12. Means 100a is provided for vertically adjusting said plug exteriorly of the tub while the lid 12c is in place, simply by operating the push buttons 101 and 102 in the well known manner.

The plug 100 having been seated, the valve 27 is thereupon operated to fill the tub to the top of the overflow plug as shown in Fig. 2, after which the detergent is added to the water, it being understood the dishes have been placed within the basket 39 and the latter is in the full line position shown in Fig. 2 with the lid 12c in place.

Valve 27 is next completely opened to permit the full force of the water to flow through the jets, the screen 89 preventing any sand or grit plugging up their minute orifices. Due to the self priming feature of the jet pumps, the treated water is entrained by them and is directed against the basket and dishes, the water delivered from said pumps rotating frame 50 together with the receptacle carried thereby.

The attendant next operates the three way valve 76 to start an upward movement of the plunger 52 through the working range of the basket. When sufficient time has elapsed for the basket to be moved vertically upward as previously described, the three way valve is again operated, permitting a quick return of the basket to the bottom of the tank as a result of the energy stored up in the coiled spring 65. Valve 76 can be operated at will to provide for the necessary vertical reciprocation of the basket in combination with its horizontal rotation to perfect a complete cleansing of the dishes.

Three minutes is the usual time allotted for thoroughly washing the dishes, at the end of which period all the soapy water has been completely drained off and fresh water fills the space formerly occupied by the treated water.

It will therefore be obvious that no rinse tub is necessary; that the rinsing operation follows the cleansing operation without any further detail.

Lastly the valve 27 is closed, the lid removed and the valve 76 operated to extend the rack to the dotted position shown in Fig. 2.

Should the water in supply line 14 be drained at some outside connection while water is in the tub and the valve 27 is open, the vacuum breaker 29 would guard against any foul water being syphoned from the tub into the main line and contaminating it.

That which is claimed is:

1. In a dishwashing machine, a tub, a cylinder secured to and suspended from the bottom of said tub, a tubular plunger arranged for reciprocating movement in said cylinder, a receptacle supporting frame within said tub carried by the upper end of said plunger means for supplying fluid under pressure to said cylinder to raise said plunger, yieldable means fastened within said plunger and acting in opposition to said fluid under pressure, conduit means by-passing a portion of the fluid from one end of said cylinder into the opposite end thereof during the downstroke of said plunger, said fluid by-passed into said cylinder acting in opposition to the upstroke of said plunger to retard it, and conduit means to by-pass the latter fluid on the upstroke of said plunger completely from the device.

2. A dishwashing machine comprising a tub, a dish supporting frame in said tub, means mounting said frame for rotary movement and simultaneously vertical reciprocation throughout a working range in said tub, a spray device in said tub arranged to spray a cleansing fluid into said frame throughout said range of rotary and reciprocatory movement, means to rotate said frame, said spray device being adapted to rotate said frame and comprising the latter means, said spray device comprising a plurality of nozzles circumferentially spaced thoughout the bottom of said tub at different radial distances from the center of said tub and with their orifices discharging in the direction of rotation of said frame, fluid pressure means to move said frame throughout said range in one direction, and yieldable means acted upon by said fluid pressure to move said frame throughout said range in the opposite direction.

3. A dishwashing machine comprising a tub, a cylinder secured to and suspended from the bottom of said tub, a plunger arranged for reciprocating movement in said cylinder, a receptacle supporting frame carried by the upper end of said plunger, valve controlled constant fluid pressure supply means to move said plunger in one direction, yieldable means placed in a condition by said fluid means to move said plunger in the opposite direction, and means to entrain a portion of the fluid ejected from one end of said cylinder by the movement of said plunger under the urge of said yieldable means in said opposite direction into the other end thereof.

4. A dishwashing machine comprising a tub, a cylinder secured to and suspended from the bottom of said tub, a plunger arranged for reciprocating movement in said cylinder a receptacle supporting frame carried by the upper end of said plunger, conduit means connected to one end of said cylinder for supplying fluid under pressure from a water supply line to said cylinder, valve means for controlling the supply of water to said conduit means, a second conduit means connecting said valve means to the opposite end of said cylinder, a by-pass conduit connected to said second said conduit means and said cylinder means to operate said valve to supply fluid under pressure through the first said conduit means to said plunger to move said frame in one direction, yieldable means comprising a coiled spring fastened to said plunger and extensibly acted upon by said fluid under pressure opposing the movement of said frame in said direction, said valve means being operable to entrain a portion of the fluid ejected from one end of said cylinder by the movement of said plunger under the retractile urge of said spring in the opposite direction through said second said conduit means into the opposite end of said cylinder, the latter fluid opposing the movement of said frame in the said one direction, said by-pass conduit by-passing the water from said cylinder which is acting in opposition to the movement of the said frame in the said direction on the upstroke of said plunger.

5. A dishwashing machine comprising a tub, a cylinder secured to and suspended from the bottom of said tub, a plunger arranged for reciprocating movement in said cylinder, a receptacle supporting frame carried by the upper end of said plunger, means for supplying fluid under pressure to said cylinder to elevate said plunger, yieldable means fastened to said plunger opposing the latter's movement in said direction, conduit means by-passing a portion of the fluid from one end of said cylinder into the opposite end thereof during the down stroke of said plunger, said fluid by-passed into said cylinder acting in opposition to the upstroke of said plunger to retard it, and conduit means to by-pass the latlater fluid on the upstroke of said plunger completely from the device.

6. A dishwashing machine comprising a tub, a receptacle supporting frame rotatively arranged for vertical reciprocation in said tub, hydraulic means to simultaneously rotate and vertically move said frame in one direction, one of said hydraulic means comprising a plurality of nozzles circumferentially spaced throughout the bottom of said tub at different radial distances from the center of said tub and with their orifices discharging in the direction of rotation of said frame, the other of said hydraulic means comprising valve controlled constant fluid pressure supply means, and yieldable means acted upon by a portion of the latter said hydraulic means and thereby placed in a condition to move said frame in the opposite direction while it continues to rotate.

7. A dishwashing machine comprising a tub, a cylinder secured to and suspended from the bottom of said tub, a plunger arranged for reciprocating movement in said cylinder, a receptacle supporting frame carried by the upper end of said plunger within the tub, means for supplying fluid under pressure to said plunger at one end of said cylinder to elevate said frame, conduit means by-passing a portion of the fluid from one end of said cylinder into the opposite end thereof during the down stroke of said plunger, said fluid by-passed into said cylinder acting in opposition to the upstroke of said plunger to retard it, and conduit means to by-pass the latter fluid on the up stroke of said plunger completely from the device.

8. A dishwashing apparatus including a tub for containing a fluid, an open dish holding basket supporting frame mounted in said tub for vertical reciprocation therein, a cylinder depending from the bottom face of said tub, said cylinder having its free end capped, a plunger in said cylinder for supporting said frame, a coiled spring mounted within said plunger, one end of said spring being connected to the upper end of said plunger adjacent the top of said cylinder and the opposite end of said spring being connected to the lower end of said cylinder adjacent the bottom of said plunger, means for supplying fluid under pressure to said cylinder to elevate said plunger against the opposition of said spring, said cylinder and said plunger having concentric walls with a clearance space between them closed at the lower end, means for by-passing the fluid discharged from said capped end on the down stroke of said plunger into the upper end of said clearance space whereby to purge said clearance space and subsequently oppose said plunger on its up stroke, and conduit means into which the by-passed fluid is discharged during the latter stroke.

9. A dishwashing machine comprising a tub, a dish basket supporting frame in said tub, means mounting said frame for rotary movement and simultaneous vertical reciprocation in said tub, hydraulic means independent of each other to rotate and vertically reciprocate said frame simultaneously, said hydraulic rotating means comprising a plurality of nozzles circumferentially spaced throughout the bottom of said tub at different radial distances from the center of said tub and with their orifices discharging in the direction of rotation of said frame, and yieldable means acting in alternation with said hydraulic reciprocating means to cause the reciprocation of said frame in one direction.

10. A dishwashing machine comprising a tub, a dish containing basket supporting frame in said tub, means mounting said frame for rotary movement and simultaneous vertical reciprocation, hydraulic means including a plurality of nozzles circumferentially spaced throughout the bottom of said tub at different radial distances from the center of said tub and with their orifices discharging in the direction of rotation of said frame, to rotate, wash and subsequently rinse the dishes in said basket supported by said frame, another hydraulic means to elevate said frame during its rotation, spring means comprising a coiled extensible spring opposing the hydraulic elevating means, and a manually operable control valve to cause the last recited hydraulic means and said spring means to act in alternation.

11. A cylinder, a plunger reciprocably mounted in said cylinder, means operatively related to one end of said plunger to be moved thereby in one direction, means for supplying fluid under pressure to said plunger at the other end of said cylinder to move said means in the said one direction, means for by-passing a portion of the fluid from the second recited end of said cylinder into the first recited end thereof during the stroke of said plunger which is opposite to the direction thereof first recited, said fluid by-passed into said cylinder acting in opposition to the stroke of the plunger in the direction first stated to retard it, and means to by-pass the latter fluid during the stroke of the plunger first recited completely from said cylinder.

12. A dishwashing machine comprising a tub, a dish supporting frame in said tub, means mounting said frame for rotary movement and simultaneously vertical reciprocation throughout a working range in said tub, a spray device in said tub arranged to spray a cleansing fluid into said frame throughout said range of rotary and reciprocatory movement, means to rotate said frame, said spray device being adapted to rotate said frame and comprising the latter means, said spray device and rotary movement means comprising a plurality of nozzles circumferentially spaced throughout the bottom of said tube at different radial distances from the center thereof, supporting means for said nozzles for selectively positioning the direction of discharge of their orifices, fluid pressure means to move said frame throughout said range in one direction, and yieldable means acted upon by said fluid pressure means to move said frame throughout said range in the opposite direction.

13. A dishwashing machine comprising a tub, a dish supporting frame in said tub, means mounting said frame for rotary and simultaneous vertical reciprocation throughout a working range in said tub, and a spray device comprising a plurality of nozzles circumferentially spaced throughout the bottom of said tub at different radial distances from the center thereof, said nozzles having their orifices positioned to direct streams of liquid laterally against said frame and its contents thereby to automatically rotate said frame.

14. The subject matter of claim 13 and, a manifold pipe located beneath said tube, a plurality of unions fastened to said manifold pipe, each of said unions being connected in a leak proof manner to the bottom of said tub and having an opening communicating therewith, and jets screwable into each said opening, said nozzles being secured to said jets.

15. In a dishwashing machine, the combination of a rotatable dish supporting means, a tub in which said dish supporting means is mounted for rotation, an outlet above the bottom of the tub for establishing a predetermined overflow level for retaining a predetermined volume of washing fluid in the bottom of the tub directly below the dish container, a plurality of short vertically disposed eduction nozzles below said dish supporting means, and having eduction openings below said level and discharge openings above said level for projecting fluid diagonally upwardly upon the dishes in said supporting means and for recirculating the washing fluid, at least one of said nozzles being directed upon the dish supporting means in a direction to produce rotation of said means, said nozzles having external connection for a source of hot water under pressure for activating the nozzles.

16. In a dishwashing machine, the combination of a dish supporting means, a tub in which said supporting means is mounted for rotation, overflow means adapted to establish intermediate the bottom of said tub and said supporting means a predetermined maximum free liquid level in said tub, a plurality of vertically disposed eduction jets below said supporting means and spaced throughout the bottom of said tub at different radial distances from the center thereof, fluid ejector means associated with each of said jets including a discharge orifice adjustable in azimuth above said jet and a lower portion having fluid eduction openings therein below said free liquid level, each of said jets being adapted to discharge a small high velocity stream of heated liquid against said discharge orifice in such a manner as to induce the flow through said eduction openings of said free liquid to form with said heated liquid a spray mixture adapted to be projected diagonally upwardly upon said supporting means to effect the cleansing of articles contained therein, at least one of said ejector means having its discharge orifice directed against said supporting means and the articles contained therein in a direction adapted to effect the rotation of said supporting means by fluid propulsion.

17. In a dishwashing machine, the combination of a dish supporting means, a tub in which said supporting means is mounted for rotation, overflow means adapted to establish intermediate the bottom of said tub and said supporting means a predetermined maximum free liquid level in said tub, a plurality of vertically disposed eduction jets below said supporting means and spaced throughout the bottom of said tub at different radial distances from the center thereof, fluid ejector means associated with each of said jets including a heart-shaped discharge orifice adjustable in azimuth above said jet and a lower portion having fluid eduction openings therein below said face liquid level, each of said jets being adapted to discharge a small high velocity stream of heated liquid against said discharge orifice in such a manner as to induce the flow through said eduction openings of said free liquid to form with said heated liquid a spray mixture having a larger total mass and lower velocity than said high velocity stream and adapted to be projected by said discharge orifice diagonally upwardly upon said supporting means in the form of a flat stream, at least one of said ejector means having its discharge orifice directed against the said supporting means in a direction adapted to effect the rotation of said supporting means and the articles contained therein solely by fluid propulsion.

18. In a dishwashing machine, the combination of a dish supporting means, a tub in which said supporting means is mounted for rotation, overflow means adapted to establish intermediate the bottom of said tub and said supporting means a predetermined maximum free liquid level in said tub, a plurality of vertically disposed eduction jets below said supporting means and spaced throughout the bottom of said tub at different radial distances from the center thereof, fluid ejector means associated with each of said jets including a discharge orifice adjustable in azimuth above said jet and a lower portion having fluid eduction openings therein below said free liquid level, each of said jets being adapted to discharge a small high velocity stream of heated liquid against said discharge orifice in such a manner as to induce the flow through said eduction openings of said free liquid to form with said heated liquid a spray mixture having a larger total mass and lower velocity than said high velocity stream and adapted to be projected diagonally upwardly upon said supporting means in the form of a spray, a plurality of said discharge orifices being directed against the supporting means and the articles contained therein in a direction adapted to effect the rotation of said supporting means by fluid propulsion, and at least one of said discharge orifices being directed against the supporting means and the articles contained therein in a direction adapted to reduce the speed of rotation of said supporting means to a predetermined speed.

19. In a dishwashing machine the combination of a tub, a dish supporting means mounted for rotation in said tub, an overflow pipe adapted to establish below said supporting means a predetermined maximum free liquid level in said tub, a plurality of vertically disposed eduction nozzles below said supporting means, said nozzles having eduction openings below said free liquid level adapted to recirculate the washing liquid upon flow of liquid through said nozzles from an external source of liquid under pressure in such a manner as to form a spray mixture of said recirculated liquid and said washing liquid, each of said nozzles including discharge means above said free liquid level adjustable in azimuth for directing said spray mixture upwardly and diagonally upon said supporting means to effect the cleansing of articles contained therein, at least one of said discharge means being directed against the supporting means and the articles contained therein in a direction adapted to effect rotation of said supporting means solely by fluid propulsion.

20. In a dishwashing machine the combination of a tub, a dish supporting means mounted for rotation in said tub, an overflow pipe adapted to establish below said supporting means a predetermined maximum free liquid level in said tub, a plurality of vertically disposed eduction nozzles below said supporting means, said nozzles having eduction openings below said free liquid level adapted to recirculate the washing liquid upon flow of liquid through said nozzles from an external source of liquid under pressure and so constructed and arranged as to form a spray mixture of said recirculated liquid and said external liquid, said nozzles having discharge means above said free liquid level adjustable in azimuth for directing said spray mixture upwardly and diagonally upon said supporting means, and at least one of said discharge means being directed against the supporting means in a direction adapted to effect rotation thereof solely by fluid propulsion.

21. In a dishwashing machine the combination of a rotatable dish supporting means, a tub in which said supporting means is mounted for rotation, an outlet above the bottom of said tub for establishing a predetermined overflow level for retaining a predetermined volume of washing fluid in the bottom of the tub directly below said supporting means, a plurality of short vertically disposed eduction nozzles mounted individually on the bottom of the tub below said supporting means, fluid conducting means extending through the bottom of said tub and adapted to communicate each of said nozzles with an external source of hot water under fluid presure sufficient to activate said nozzles, each of said nozzles having eduction openings below said overflow level and discharge openings above said level so constructed and arranged as to recirculate said washing fluid and to form a spray mixture of said washing fluid and said external water at least one of said discharge openings being directed upon said supporting means in a direction adapted to produce rotation thereof and to project fluid diagonally and upwardly upon said supporting means.

RAYMOND W. WILSON.

REFERENCES CITED

The following references are of record in the file of this patent:

UNITED STATES PATENTS

| Number | Name | Date |
|---|---|---|
| 1,040,021 | Sanborn et al. | Oct. 1, 1912 |
| 1,281,864 | Sparr | Oct. 5, 1918 |
| 1,397,652 | Pierce | Nov. 22, 1921 |

(Other references on following page)

UNITED STATES PATENTS

| Number | Name | Date |
|---|---|---|
| 1,525,756 | McKenney et al. | Feb. 10, 1925 |
| 1,574,452 | South | Feb. 23, 1926 |
| 1,633,803 | Ballin | June 28, 1927 |
| 1,730,348 | Anstiss | Oct. 8, 1929 |
| 1,734,137 | Krocker | Nov. 5, 1929 |
| 1,949,814 | Replogle | Mar. 6, 1934 |
| 1,959,661 | Ellington et al. | May 22, 1934 |
| 1,979,504 | Tafel | Nov. 6, 1934 |

| Number | Name | Date |
|---|---|---|
| 2,044,524 | Caise | June 16, 1936 |
| 2,062,704 | Forsyth | Dec. 1, 1936 |
| 2,201,380 | Tierney | May 21, 1940 |
| 2,203,029 | Partridge | June 4, 1940 |

FOREIGN PATENTS

| Number | Country | Date |
|---|---|---|
| 204,452 | Germany | Nov. 24, 1908 |
| 286,092 | Great Britain | Mar. 1, 1928 |
| 295,516 | Italy | Apr. 23, 1932 |